Patented Dec. 5, 1950

2,532,699

UNITED STATES PATENT OFFICE 2,532,699

SEALING COMPOSITION

John B. De Coste, Basking Ridge, N. J., assignor to Bell Telephone Laboratories, Incorporated, New York, N. Y., a corporation of New York No Drawing. Application December 3, 1947, Serial No. 789,567

7 Claims. (Cl. 260—27)

This invention relates to a composition of matter, and more particularly to a compounded mixture for use in sealing insulated electrical conductors such as cables, and other electrical devices such as condensers, coils, transformers, and the like.

An object of the present invention is to provide a composition of matter for use in electrical devices, which shall be adhesive to both metallic surfaces and surfaces of thermoplastic and other non-metallic materials employed in the manufacture of electrical devices.

In compositions used for flooding and sealing electrical devices, it is desirable to use a composition which has a high fluidity at higher temperatures, such as the temperature of application, so that the composition will run into and fill up the cracks or pores in the object to be sealed. However, it is also desirable to use as a sealing agent a composition which at room temperature will set, or gel, and become non-fluid so that it will not move about when the electrical device is in operation. It is also necessary that the material, after gelling to a non-fluid state, retain its adhesive qualities and remain non-rigid, preferably soft and plastic, and that it not shrink substantially upon cooling. In sealing compositions used in the past, it has been found difficult to meet these requirements, for those compositions which are easily fluid at higher temperatures do not set to non-flowable mixtures of the requisite properties at room temperature, and those compositions which are non-fluid at room temperatures and which have the other requisite properties are not easily fluid at higher temperatures, and thus are difficult to apply.

It is an object of the present invention to provide a composition which avoids the above-described difficulties, and which is easily flowable at the temperature of application and which is relatively non-fluid at room temperatures.

It is also an object of the present invention to provide a composition which will assist in the formation of a satisfactory soldered joint between metallic surfaces where the composition may be present.

With the above and other objects in view, the invention may be embodied in a composition comprising essentially a mixture of a normally viscous fluid or plastic polymer of a monoolefin, such as polybutene, hydrogenated rosin, and an amide wax. The various ingredients are compounded in such proportions as may be required by the use to which the composition is to be put.

A suitable composition may have the following proportions:

| | Percentage by weight |
|---|---|
| Polymerized olefin | 50–94 |
| Hydrogenated rosin | 5–30 |
| Amide wax | 1–10 |

The function of the amide wax in this composition is to form a heat reversible gel by a physical mechanism which comes about because of the fact that at high temperatures the amide wax dissolves in the remainder of the composition whereas when the temperature is lowered the amide wax is precipitated as colloidal particles, which form a gel structure. The polymerized olefin and the hydrogenated rosin are held in a network of the gel formed by the amide wax thus forming a relatively non-flowing composition. If the proper amount of the amide wax is used, the composition will remain resistant to flow at temperatures up to 100° C., so that the electrical device in which the composition is used may become heated up in operation without causing the sealing agent to become dislodged from its position.

When heat is applied to the composition, the gel structure of the amide wax is broken down, and the wax dissolves to some extent in the polymerized olefin and the hydrogenated rosin. Since the latter are no longer held in the gel formed by the wax, the whole composition becomes fluid.

The proportions of the amide wax and hydrogenated rosin used in the composition may be varied according to the properties desired in the finished mixture. It is usually desirable to use the amide wax in amounts of from about 1 per cent by weight to about 10 per cent by weight. The preferred amount is from about 3 per cent to about 5 per cent by weight.

The above-described gelation phenomenon may be achieved with any amide wax, that is any wax the molecules of which contain amide groups, which is soluble at elevated temperatures in the mixture of polybutene, or other polymerized monoolefin, and hydrogenated rosin. Any amide wax, the molecules of which contain at least one long chain aliphatic hydrocarbon group, preferably alkyl and more preferably straight chain alkyl, preferably containing between 12 and 20 carbon atoms, and which contain at least one amide group, will be suitable for the purposes of the present invention. In such substances the long hydrocarbon chain is responsible for solubility in the composition and the amide groups are responsible for the powerful gelling action.

If the amide nitrogen atom carries an unsubstituted hydrogen atom, the gelling action tends to be more effective.

There are two common types of amide waxes which possess outstanding suitability for the purposes of the present invention. The first is the condensate of a fatty acid with an aliphatic amine, which may be either a monoalkyl monoamine, a polyalkyl monoamine or an alkylene polyamine. The second is the condensate of two mols of a long chain fatty acid amide with one mol of formaldehyde. In each case one of the ingredients entering into the condensation reaction is chosen which has in its molecule a long aliphatic hydrocarbon chain, preferably alkyl and preferably containing 12 to 20 carbon atoms, as discussed above.

Thus in the preparation of the first type of amide wax, a lower fatty acid, such as acetic acid, propionic acid or butyric acid, may be condensed with an alkylamine containing between 12 and 20 carbon atoms, such as cetylamine, to produce an amide wax, such as cetyl acetamide. Or a higher fatty acid containing an alkyl chain having between 12 and 20 carbon atoms, such as stearic acid, may be condensed with an alkylene polyamine, such as ethylene diamine, diethylene triamine or triethylene tetramine. The resulting amide wax in each case is effective for the purposes of the present invention.

In the preparation of amide waxes of the second type, two mols of an amide of a higher fatty acid containing an alkyl radical having between 12 and 20 carbon atoms, such as stearic acid, may be condensed with one mol of formaldehyde. The resulting wax is very effective for the purposes of the present invention.

The primary function of the hydrogenated rosin in the composition is to prevent the premature gelling of the amide wax, thus permitting the composition to remain fluid for a sufficient time, so that it will be able to run into any pores or cracks which may be present in the electrical device which is being sealed. It is believed that the hydrogenated rosin performs this function because it promotes the solubility of the amide wax in the polymerized olefin thus delaying the formation of a gel.

The hydrogenated rosin may be used in amounts from about 5 per cent or 10 per cent by weight up to about 30 per cent by weight. The higher the percentage of hydrogenated rosin used, the more efficient is the composition as a solder flux.

A convenient way of securing the desired consistency of the composition of the present invention, both at the elevated temperatures at which it is applied to electrical or other apparatus and at ordinary temperatures, is to add to the mixture one or more polybutenes of different average molecular weight one having a normally fluid consistency, the other being more plastic in nature at ordinary temperatures. A convenient polybutene of fluid consistency is one sold commercially which has an average molecular weight of about 5,000, a brittle point of between about −20° C. and −30° C. and a viscosity of about 5 poises at 150° C. A convenient polybutene of plastic consistency is sold commercially having an average molecular weight of about 12,000 and a brittle point between about −40° C. and −50° C.

Ordinarily the polybutene having a molecular weight of about 5,000 may be used in amounts from about 50 per cent to about 85 or 90 per cent by weight. This polybutene has the consistency of heavy molasses at room temperature, and thus tends to give the gelled composition plasticity and mobility. The polybutene having an average molecular weight of about 12,000 has a consistency of chewing gum at room temperature, and thus makes the gelled composition more rigid and gives it good adhesive properties. If it is desired to have a gelled composition with a high degree of plasticity the high molecular weight polybutene may be left out altogether. However, if it is desired to have a composition with a certain degree of rigidity this polybutene may be used in amounts all the way up to 50 per cent. A preferred amount of this polybutene for use in a composition having good adhesive properties is from about 15 per cent to about 30 per cent by weight.

Since the composition may oxidize when heated to higher temperatures, an antioxidant may be added in amounts of about 0.5 per cent or 1 per cent by weight. Any suitable well-known antioxidant may be used, such as polymerized trimethyldihydroquinoline.

The percentages of the ingredients to be used are determined by the use to which the composition is to be put, as indicated above. If a composition is desired for use as an adhesive, such as a cement for a metal sheath for a cable, a good proportion of the high molecular weight polymerized olefin should be used. Only the low molecular weight polymerized olefin is used if a composition is desired which is more tacky so that it may be used as a flooding compound, such as a compound for filling the space between a metal sheath of a cable and an overlying layer of plastic material.

If a composition is desired which will function both as a flooding compound and a soldering flux, a high content of hydrogenated rosin is used. With such a composition a metal strip may be fashioned into a cable sheath over a cable covered with the composition and may be soldered without the use of any additional flux.

The ingredients of the present composition may be mixed together in any suitable manner. It is usually preferable, however, to add the amide wax, hydrogenated rosin, and other ingredients to the low molecular weight polymerized olefin.

The following specific examples will serve to illustrate the compositions which may be made according to the present invention:

*Example 1.*—A composition which may be used as an adhesive.

| | Percentage by weight |
|---|---|
| Polybutene (approximate average molecular weight of 5,000) | 70.0 |
| Polyisobutylene (approximate average molecular weight of 12,000) | 15.0 |
| Hydrogenated rosin | 10.0 |
| Condensate of long chain fatty acid with alkyl polyamine | 4.0 |
| Antioxidant | 1.0 |

*Example 2.*—A composition which may be used as a flooding compound.

| | Percentage by weight |
|---|---|
| Polybutene (approximate average molecular weight of 5,000) | 85.0 |
| Hydrogenated rosin | 10.5 |
| Condensation product of stearamide and formaldehyde | 4.0 |
| Antioxidant | 0.5 |

*Example 3.*—A composition which will act both as a flooding compound and a soldering flux.

|  | Percentage by weight |
|---|---|
| Polybutene (approximate average molecular weight of 5,000) | 65.5 |
| Hydrogenated rosin | 30.0 |
| Condensate of long chain fatty acid with alkyl polyamine | 4.0 |
| Antioxidant | 0.5 |

It is to be understood that the form of the invention herewith shown and described is to be taken as a preferred example of the same, and that known chemical equivalents may be employed, and that changes may be resorted to in the proportions of the ingredients, without departing from the spirit of the invention or the scope of the subjoined claims.

What is claimed is:

1. A composition comprising from about 50 per cent to about 94 per cent of a viscous liquid polybutene, from about 5 per cent to about 30 per cent of hydrogenated rosin, and from about 1 per cent to about 10 per cent of an amide wax soluble in said composition at elevated temperatures.

2. The composition of claim 1 in which the amide wax comprises the condensate of a fatty acid and an alkyl amine, said condensate containing a long chain, monovalent, aliphatic hydrocarbon radical.

3. The composition of claim 1 in which the amide wax comprises the product obtained from condensing two mols of stearamide with 1 mol of formaldehyde.

4. A composition comprising from about 50 per cent to about 90 per cent of a polybutene having an average molecular weight of about 5,000, up to about 50 per cent of a polybutene having an average molecular weight of about 12,000, from about 5 per cent to about 30 per cent of hydrogenated rosin, and from about 1 per cent to about 10 per cent of an amide wax, the molecules of which contain at least one amide group and at least one long chain aliphatic hydrocarbon group.

5. The composition of claim 4 in which the amide wax is used in amounts of from about 3 per cent to about 5 per cent.

6. A composition comprising a mixture of from about 50 per cent to about 90 per cent of a polybutene having an average molecular weight of about 5,000 and from about 5 per cent to about 30 per cent of hydrogenated rosin, said mixture being gelled with from about 1 per cent to about 10 per cent of an amide wax dispersed therein, the molecules of said amide wax containing at least one amide group and at least one long chain aliphatic hydrocarbon group.

7. A composition for use as a sealing agent and as a soldering flux comprising from about 50 per cent to about 85 per cent of a polybutene having an average molecular weight of about 5,000, hydrogenated rosin in amounts from about 10 per cent to about 30 per cent, and from about 1 per cent to about 10 per cent of an amide wax, the molecules of which contain at least one amide group and at least one straight chain aliphatic hydrocarbon group containing between 12 and 20 carbon atoms.

JOHN B. DE COSTE.

REFERENCES CITED

The following references are of record in the file of this patent:

UNITED STATES PATENTS

| Number | Name | Date |
|---|---|---|
| 2,098,538 | Charch et al. | Nov. 9, 1937 |
| 2,349,508 | Mack | May 23, 1944 |
| 2,408,297 | Cubberley et al. | Sept. 24, 1946 |